United States Patent Office 3,219,693
Patented Nov. 23, 1965

3,219,693
PROCESS FOR THE ISOMERIZATION OF MALEIC ACID IN THE PRESENCE OF DODECYL ALCOHOL
Mitchell Becker, Teaneck, N.J., assignor to Halcon International, Inc., a corporation of Delaware
No Drawing. Filed Oct. 25, 1963, Ser. No. 318,802
2 Claims. (Cl. 260—537)

This invention relates to a new and improved process for the preparation of high purity fumaric acid. Specifically, this invention teaches a method of forming fumaric acid crystals of a large crystal size by the isomerization of maleic acid in the presence of dodecyl alcohol.

Fumaric acid is a chemical of great commercial importance. For example it is used extensively in the preparation of butyl ester resins, paints, varnish, molding powders, and furniture laquers and as a replacement for citric acid and tartaric acid.

The formation of fumaric acid in large crystals is particularly important, since such crystals are much more saleable. Small crystals are undesirable because of their tendency to powder and cake.

Fumaric acid is conventionally formed by the isomerization of maleic acid. In the course of the isomerization the low solubility fumaric acid product precipitates from the solution. Generally, according to the procedures of the prior art, the precipitate is a small and/or low strength crystal.

In accordance with this invention it has been found that large size rugged crystals of fumaric acid are formed when dodecyl alcohol is added to the maleic acid solution which is to be isomerized. The amount of alcohol added to the maleic acid isomerization solution may vary widely. Improved results are obtained with even small quantities of the alcohol. Generally, at least 2 p.p.m. (based on the maleic acid solution) must be employed. As a practical matter at least 10 p.p.m. are added, preferably 60 p.p.m. The upper limit is not of great importance, it being determined primarily by economic considerations. Generally, there is no additional advantage in adding more than 300 p.p.m.

The maleic acid solution which is isomerized may contain from 5 to 60% by wt. of maleic acid. Generally from 25 to 50% solutions are employed.

The instant invention is applicable to essentially all aqueous solutions of maleic acid which may be subjected to isomerization to form fumaric acid. Conventionally, the maleic acid is formed by the oxidation of benzene; however, there is no need that this particular synthesis be selected, for example, maleic acid may be derived from butene-2.

The isomerization of maleic acid to fumaric acid is well known in the art as are the catalysts and reaction conditions which are employed. Preferably, the isomerization catalyst employed is a combination of a bromine-containing compound and a strong oxidizing agent, e.g., ammonium bromide and ammonium persulfate. These types of catalysts are more fully defined in copending application, Serial No. 305,547, filed August 29, 1963. Though these catalysts are preferred, a wide variety of other isomerization catalysts have been described in the literature. These include thiazole, thiourea, thiazoline, thiuram disulfide, dithiocarbonates, mercaptans, alkyl disulfide, heavy metal salts, ammonia, pyridine, primary and secondary amine, iodine, nitric acid, hydrochloric acid, sulfuric acid, potassium thiocyanate. The use of these catalyst is discussed in U.S. Patent 2,790,827 and in Kirk-Othmer, "Encyclopedia of Chemical Technology," Interscience, 1952, volume 8, page 692.

If desired, the maleic acid solution obtained by scrubbing a maleic anhydride containing gas may be subjected to preliminary purification treatment. These are often advantageous when the maleic acid is contaminated, or particularly dark in color. Adsorbents may be used, such as activated carbon and the zeolites. A particularly preferred technique is that set forth in U.S. Patent No. 3,109,025. The addition of up to 5% of sodium chlorate, preferably from 1 to 3 wt. percent, is also beneficial.

The separation of the fumaric acid from the mother liquor can be accomplished by any known means. The separated crystals are preferably water washed and dried. This simple procedure for the production of the finished product should be compared to the recrystallization procedures which were necessitated by the prior art to obtain large size, rugged crystals which are at a premium in the fumaric acid market.

To illustrate more fully the advantages of the instant invention the following examples:

GENERAL PROCEDURE

One liter of a 30% by wt. aqueous solution of maleic acid containing 0.5% of ammonium bromide and 3.0% of ammonium persulfate (both based on maleic acid) is heated to 65° C. for 30 minutes in a boiling methanol bath. The precipitate of fumaric acid is filtered, while the solution is still hot, and the filtrate washed with about one part of water for each part of fumaric acid formed. The fumaric acid filtrate is dried at 70° C. to a constant weight, and then screened through a 100 mesh screen to determine the percentages of the particles less than 100 mesh. To test the frangibility of the crystals a 25 gram sample of the material retained on the 100 mesh screen in the previous test is agitated for 2 minutes on a 100 mesh screen with 175 grams of #6 glass beads. Again the percentage of the material passing through the 100 mesh screen is determined.

*Example 1*

In each of the following runs 100 parts per million of additive is incorporated into the maleic acid solution prior to the isomerization. The following table compares the results obtained:

| Run No. | Additive | Percent Through a 100 Mesh Screen | |
|---|---|---|---|
| | | Originally | Glass Beads Test |
| 1 | None | 3.5 | 48.0 |
| 2 | ___do___ | 2.8 | 56.0 |
| 3 | Dodecyl alcohol | 0.3 | 12.0 |
| 4 | ___do___ | Nil | 20.0 |
| 5 | ___do___ | Nil | 16.0 |
| 6 | Undecyl alcohol | 5.3 | 46.0 |
| 7 | Tetradecyl alcohol | 0.5 | 40.7 |
| 8 | Cetyl alcohol | 0.7 | 50.0 |
| 9 | Stearyl alcohol | 5.2 | 52.0 |
| 10 | Coconut oil | 7.3 | 56.0 |
| 11 | Polyoxyethylene (20) sorbito monolaurate. | 3.9 | 54.0 |
| 12 | Polyoxyethylene (40) sorbitol monopalmitate. | 5.3 | 56.0 |
| 13 | Polyoxyethylene (80) sorbitol monooleate. | 4.8 | 56.0 |
| 14 | "Aerosol-OT" | 8.6 | 50.0 |
| 15 | Lauric acid | 4.1 | 49.0 |
| 16 | Ammonium alginate | 1.1 | 64.0 |
| 17 | Gum arabic | 1.3 | 68.0 |
| 18 | Sodium laurate succinate | 1.8 | 84.0 |

It will be noted that where no additive is used, or an additive other than the dodecyl alcohol is employed, the crystals are considerably more fragile. After the glass bead test, where the dodecyl alcohol is added, an average of only about 16% passed through the 100 mesh screen. On the other hand, the percent passing through the screen in all other instances is in excess of 40%. This clearly shows the efficacy of the dodecyl alcohol when added in accordance with the instant invention. The unique effect of the dodecyl alcohol is particularly surprising. Closely related alcohols such as undecyl alcohol, tetradecyl alcohol, cetyl alcohol, and stearyl alcohol are ineffective. Additionally, the above data show that well known surface active agents also are uneffective.

*Example 2*

The above run is repeated, with the exception that only 60 p.p.m. of dodecyl alcohol are added. Essentially similar results are obtained.

*Example 3*

Example 1 is repeated, with the exception of 200 p.p.m. of dodecyl alcohol are added. Similar results are obtained.

*Example 4*

Example 1 is repeated, except only 15 p.p.m. of alcohol is added. While not as appreciable as the previous experiments an improvement is noted. The glass bead test shows only 30% through.

In view of the foregoing disclosures, variations and modifications thereof will be apparent to one skilled in the art, and it is intended to include within the invention all such variations and modifications thereof except as do not come within the scope of the appended claims.

I claim:
1. In a process for the preparation of fumaric acid crystals by the catalytic isomerization of a maleic acid solution containing about 5 to 60% by weight of maleic acid, the improvement of performing the isomerization in the presence of at least 2 p.p.m. of dodecyl alcohol based on maleic acid solution, thereby forming large strong crystals.
2. The process of claim 1 wherein the dodecyl alcohol added is at least 10 parts per million based on the maleic acid solution.

References Cited by the Examiner

UNITED STATES PATENTS

| | | | |
|---|---|---|---|
| 2,578,134 | 8/1956 | Dobratz | 260—537 |
| 2,790,827 | 4/1957 | Cummings et al. | 260—537 |
| 3,109,025 | 10/1963 | Olenberg | 260—537 |

OTHER REFERENCES

Hoerr et al.: Journal of Organic Chemistry, vol. 9, pages 267 to 279 (1944).

LORRAINE A. WEINBERGER, *Primary Examiner.*

LEON ZITVER, *Examiner.*